United States Patent
Chen et al.

(10) Patent No.: US 9,046,724 B1
(45) Date of Patent: Jun. 2, 2015

(54) LIQUID CRYSTAL DISPLAY DEVICE

(75) Inventors: Shih Hsiang Chen, Shenzhen (CN); Jiahe Cheng, Shenzhen (CN)

(73) Assignee: SHENZHEN CHINA STAR OPTOELECTRONICS TECHNOLOGY CO. LTD., Shenzhen (CN)

( * ) Notice: Subject to any disclaimer, the term of this patent is extended or adjusted under 35 U.S.C. 154(b) by 0 days.

(21) Appl. No.: 13/636,704

(22) PCT Filed: Sep. 3, 2012

(86) PCT No.: PCT/CN2012/080909
§ 371 (c)(1),
(2), (4) Date: Sep. 24, 2012

(87) PCT Pub. No.: WO2014/032303
PCT Pub. Date: Mar. 6, 2014

(30) Foreign Application Priority Data

Aug. 27, 2012 (CN) .......................... 2012 1 0307707

(51) Int. Cl.
*G02F 1/1333* (2006.01)
*G02F 1/1345* (2006.01)
*F21V 8/00* (2006.01)

(52) U.S. Cl.
CPC ...... *G02F 1/13452* (2013.01); *G02F 1/133382* (2013.01); *G02F 1/133308* (2013.01); *G02B 6/0088* (2013.01); *G02B 6/005* (2013.01)

(58) Field of Classification Search
CPC .......... G02F 1/13452; G02F 1/133382; G02F 1/33308; G02F 1/133608; G02F 2001/133628; G02B 6/0088; G02B 6/005
USPC ..................................... 349/58, 65, 150, 161
See application file for complete search history.

(56) References Cited

U.S. PATENT DOCUMENTS

| 2009/0080148 A1* | 3/2009 | Sugawara ................ 361/679.02 |
| 2011/0170017 A1* | 7/2011 | Liu ................ 348/739 |
| 2011/0211139 A1* | 9/2011 | Itoh ................ 349/60 |

* cited by examiner

*Primary Examiner* — Dung Nguyen
*Assistant Examiner* — Tai Duong
(74) *Attorney, Agent, or Firm* — Mark M. Friedman

(57) ABSTRACT

The present invention discloses an LCD device. The LCD device includes a bezel, a light guide plate on the light source for guiding light, an optical film on the light guide plate for processing the guided light through the light guide plate, an LCD panel directly carried on the optical film, a driving chip, a FPC with metal wires, wherein the driving chip bonds with the FPC and is used for being coupled to the LCD panel via the metal wires of the FPC, and a heat sink attached between the bezel and the FPC and used for dissipating heat generated from the driving chip.

10 Claims, 2 Drawing Sheets

LIQUID CRYSTAL DISPLAY DEVICE

BACKGROUND OF THE INVENTION

1. Field of the Invention

The present invention relates to a liquid crystal display (LCD) device, more particularly, to an LCD device capable of omitting a housing.

2. Description of the Prior Art

LCDs are widely used in modern information equipments such as computers, cell phones, personal digital assistances (PDAs), etc, due to their thin, lightweight, low power consumption features. Generally, an LCD comprises a liquid crystal panel and a backlight module. Since the liquid crystal panel itself does not light, the LCD requires light sources which emit light from the backlight module. Light emitted by the backlight modules passes through liquid crystals in the liquid crystal panel. The intensity of light which would be conveyed to a viewer is adjusted by means of an alignment of the liquid crystals. Subsequently, images are produced.

According to the location of light sources, the backlight module of the LCD device is classified as a side-light type and a direct-light type. For the side-light type backlight module, light sources illuminate the LCD from the side of the display panel. Light produced by the light sources emits to the liquid crystal panel. For the direct-light type backlight module, light sources illuminate the LCD from the bottom of the display panel. Light produced by the light sources emits to the liquid crystal panel.

Please referring to FIG. 1, FIG. 1 shows a structure of a conventional LCD device 100. The LCD device 100 comprises an LCD panel 110, a frame 120, a housing 130, an optical film 140, a light guide plate 150, a bezel 160, a flexible printed circuit board (FPC) 170 and a driving chip 180.

The bezel 160 is used for carrying on the light guide plate 150 which is used for guiding light from a light source. The optical film 140 on the light guide plate 150 is used for processing the guided light through the light guide plate 150. The housing 130 is on the optical film 140 and used for pressing the optical film 140 to fix a relative position of the optical film 140.

Besides, the driving chip 180 is bonded on the FPC 170, and the LCD panel 110 is attached to one side of the FPC 170 so that the driving chip 180 is capable of outputting driving signals to the LCD panel 110 via metal wires of the FPC 170. The FPC 170 is attached to the other side of the frame 120.

The LCD panel 110 is carried on by the housing 130 and used for controlling turning directions of inside liquid crystal according to driving signals from the driving chip 180 to adjust the light intensity from the optical film 140 and then displaying images.

The frame 120 is used for fixing a relative position of the LCD panel 110.

Under the above-mentioned structure, however, the LCD panel 110 has to be carried on by the housing 130, and it costs more and takes mould to produce the housing 130. In addition, it is not effective for the driving chip 180 to cool in the arrangement that the driving chip 180 and FPC 170 locating between the housing 130 and the frame 120.

Furthermore, there has to be sufficient width of the housing 130 to press the four sides of the optical film 140 to fix the optical film 140.

But, recently, there is a trend towards a narrow frame used in an LCD device. The sufficient width of the housing 130 of the LCD device 100, however, conflicts the design of narrow frame.

For that reason, it is necessary to provide solutions.

SUMMARY OF THE INVENTION

The present invention provides an LCD device with a new module structure without a housing to reduce cost, simplify manufacturing process and to reinforce heat dissipation efficiency. Furthermore, the design of narrow frame is achieved by the appropriate module plan without a housing as well.

According to the present invention, a liquid crystal display (LCD) device comprises: a bezel; a light guide plate on the bezel for guiding light; an optical film on the light guide plate for processing guided light through the light guide plate; an LCD panel on the optical film; a driving chip; a flexible printed circuit board (FPC) comprising metal wires; and a heat-dissipating member, attached between the bezel and the FPC, for dissipating heat generated from the driving chip. The driving chip bonds with the FPC and is used for being coupling to the LCD panel via the metal wires of the FPC.

In one aspect of the present invention, the driving chip bonds with the FPC by using a chip on film (COF) technology.

In another aspect of the present invention, the LCD device further comprises a plastic thin film for fixing the LCD panel. One side of the plastic thin film is attached to the LCD panel.

In still another aspect of the present invention, the other side of the plastic thin film is attached to the heat-dissipating member.

In still another aspect of the present invention, the plastic thin film is made of Polyethylene terephthalate (PET).

According to the present invention, an LCD device comprises: a bezel; a light guide plate on the light source for guiding light; an optical film on the light guide plate for processing guided light through the light guide plate; an LCD panel on the optical film; a heat-dissipating member; and a plastic thin film, one side of the plastic thin film being attached to the LCD panel, for fixing the LCD panel. The heat-dissipating member is attached between the other side of the plastic thin film and the bezel.

In one aspect of the present invention, the plastic thin film is made of Polyethylene terephthalate (PET).

In another aspect of the present invention, the LCD device further comprises a driving chip and a FPC comprising metal wires. The driving chip bonds with the FPC and is used for being coupled to the LCD panel via the metal wires of the FPC.

In still another aspect of the present invention, the heat-dissipating member is attached between the bezel and the FPC and is used for dissipating heat generated from the driving chip.

In still another aspect of the present invention, the driving chip bonds with the FPC by using a chip on film (COF) technology.

The advantages of the present invention are that the present invention provides an LCD device with a new module structure without a housing to reduce cost, to simplify manufacturing process and to reinforce heat dissipation efficiency by attaching a heat-dissipating member to a metal bezel. The LCD device of the present invention also replaces a frame with a plastic thin film to reduce cost. The design of narrow frame which means narrow width around an LCD panel is achieved on account of no use of a housing and the substitution of a frame for a plastic thin film.

BRIEF DESCRIPTION OF THE DRAWINGS

For better understanding embodiments of the present invention, the following detailed description taken in conjunction with the accompanying drawings is provided. Apparently, the accompanying drawings are merely for some of the embodiments of the present invention. Any ordinarily skilled person in the technical field of the present invention could still obtain other accompanying drawings without use laborious invention based on the present accompanying drawings.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1:
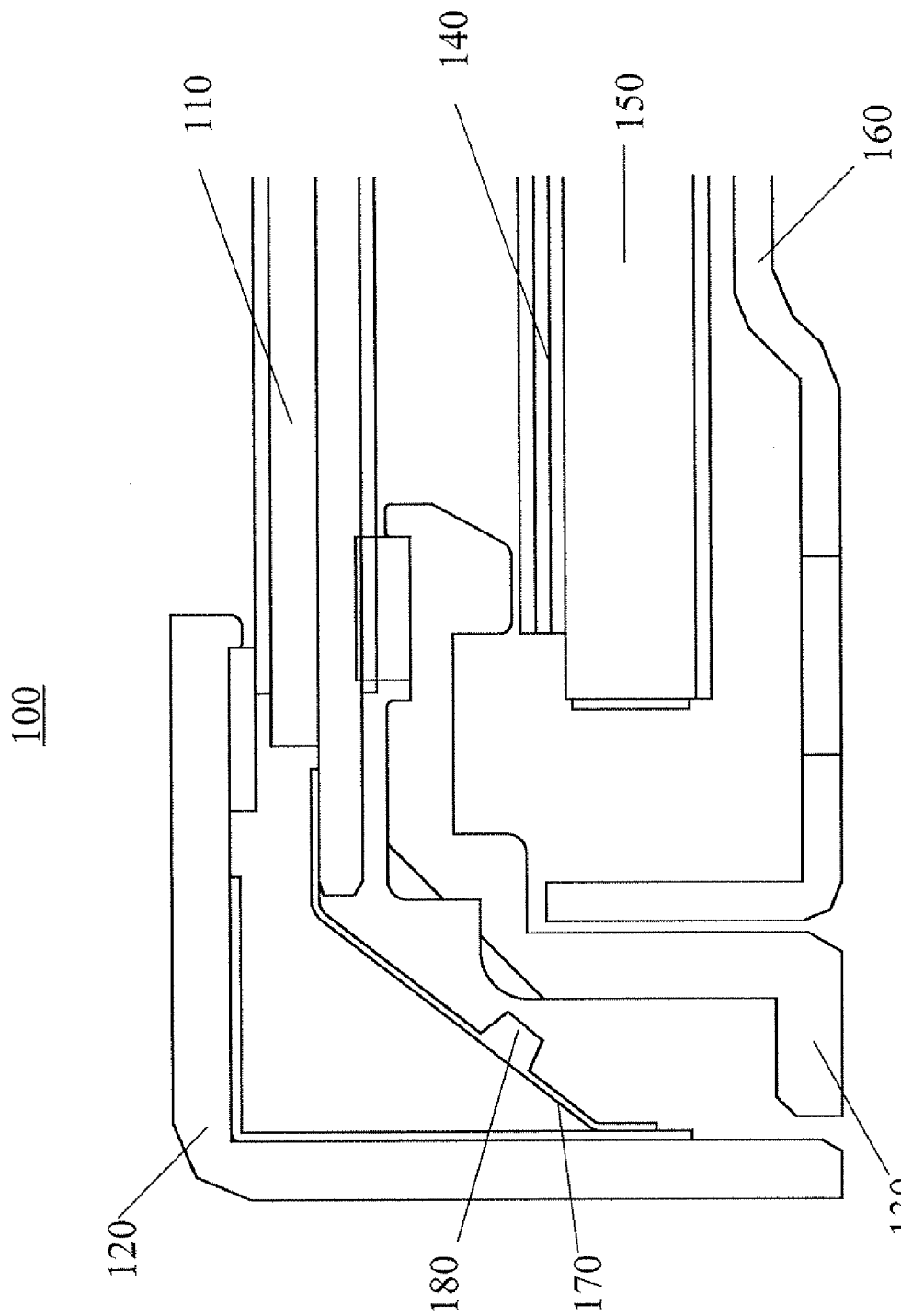
FIG. 1 shows a structure of a conventional LCD device.
Figure 2:
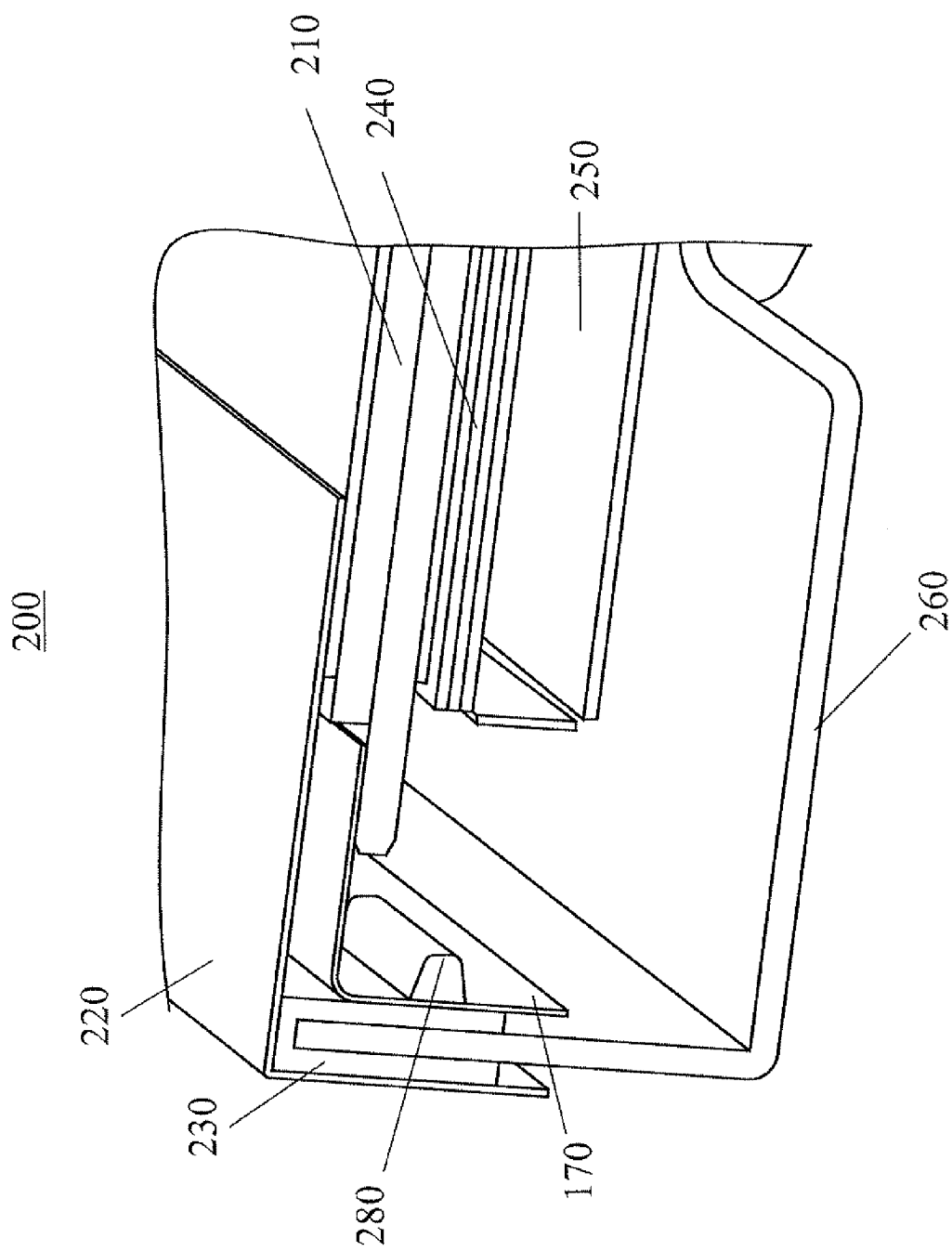
FIG. 2 illustrates a structure diagram of an LCD device according to a preferred embodiment of the present invention.

Please referring to FIG. 2, FIG. 2 illustrates a structure diagram of an LCD device 200 according to a preferred embodiment of the present invention. The LCD device 200 comprises an LCD panel 210, a plastic thin film 220, a heat-dissipating member 230, an optical film 240, a light guide plate 250, a bezel 260, a flexible printed circuit board (FPC) 270 and a driving chip 280.

The bezel 260 is used for carrying on the light guide plate 250 which is used for guiding light from a light source, and the optical film 240 which is on the light guide plate 250 and used for processing the guided light through the light guide plate 250.

It is noted that the LCD device 200 does not arrange a housing. The LCD panel 210 of the embodiment directly presses and is carried on the optical film 240 to fix a relative position of the optical film 240. That is the reason that the present invention is capable of reducing the cost of the housing and the mould for producing the housing to simplify manufacture.

In addition, the driving chip 280 bonds with the FPC 270 by using chip on film (COF) technology. That is to say that the driving chip 280 bonds onto the FPC 270, and the LCD panel 210 is attached to one side of the FPC 270 so that the driving chip 280 is capable of outputting driving signals to the LCD panel 210 via wires of the FPC 270 coupled with the LCD panel 210. Therefore, the LCD panel 210 controls turning directions of inside liquid crystal according to driving signals from the driving chip 280 to adjust the light intensity from the optical film 240 and then displaying images.

It is noted that there are also different arrangements of the FPC 270 in the LCD device 200 in the present invention. The FPC 270 of the embodiment is attached to the bezel 260 by the heat-dissipating member 230 at the position of the driving chip 280. In other words, the heat-dissipating member 230 is attached between the bezel 260 and the driving chip 280 (the FPC 270) so that the heat-dissipating member 230 is capable of conducting the heat generated from the driving chip 280 to the bezel 260 to sink heat. Therefore, it not only strengthens cooling effect of the driving chip 280 but also prevents the bezel 260 from scuffing the driving chip 280.

In addition, the LCD device 200 in the present invention substitutes a frame for the plastic thin film 220. The plastic thin film 220 is made of Polyethylene terephthalate (PET). One side of the plastic thin film 220 is attached to the LCD panel 210 to fix a relative position of the LCD panel 210, and the other side is attached to the bezel 260 by the heat-dissipating member 230. That is to say that the present invention fastens the LCD panel 210 by the plastic thin film 220 to reduce the cost of a frame.

Moreover, there is another advantage for the LCD device 200 of the present invention that the design of narrow frame, which means narrow width around the LCD panel 210, is achieved on account of no use of a housing and the substitution of a frame for the plastic thin film 220.

Comparing with the prior art, the LCD device of the present invention with a new module structure without a housing reduces cost, simplifies manufacturing process and reinforces heat-dissipating efficiency by attaching a heat-dissipating member to a metal bezel. The LCD device of the present invention also replaces a frame with a plastic thin film to reduce costs. The design of narrow frame, which means narrow width around an LCD panel, is achieved on account of no use of a housing and the substitution of a frame for a plastic thin film.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A liquid crystal display (LCD) device, comprising:
   a bezel;
   a light guide plate on the bezel for guiding light;
   an optical film on the light guide plate for processing guided light through the light guide plate;
   an LCD panel on the optical film;
   a driving chip;
   a flexible printed circuit board (FPC) comprising metal wires, wherein the driving chip bonds with the FPC and is used for being coupling to the LCD panel via the metal wires of the FPC; and
   a heat-dissipating member, attached between the bezel and the FPC, for dissipating heat generated from the driving chip.

2. The LCD device of claim 1, wherein the driving chip bonds with the FPC by using a chip on film (COF) technology.

3. The LCD device of claim 1 further comprising:
   a plastic thin film, one side of the plastic thin film being attached to the LCD panel, for fixing the LCD panel.

4. The LCD device of claim 3, wherein the other side of the plastic thin film is attached to the heat-dissipating member.

5. The LCD device of claim 3, wherein the plastic thin film is made of Polyethylene terephthalate (PET).

6. An LCD device, comprising:
   a bezel;
   a light guide plate on the bezel for guiding light;
   an optical film on the light guide plate for processing guided light through the light guide plate;
   an LCD panel on the optical film;
   a heat-dissipating member; and
   a plastic thin film, one side of the plastic thin film being attached to the LCD panel, for fixing the LCD panel;
   wherein the heat-dissipating member is attached between the other side of the plastic thin film and the bezel.

7. The LCD device of claim 6, wherein the plastic thin film is made of Polyethylene terephthalate (PET).

8. The LCD device of claim 6 further comprising:
   a driving chip; and a FPC comprising metal wires, wherein the driving chip bonds with the FPC and is used for being coupled to the LCD panel via the metal wires of the FPC.

9. The LCD device of claim 8, wherein the heat-dissipating member is attached between the bezel and the FPC and is used for dissipating heat generated from the driving chip.

10. The LCD device of claim 8, wherein the driving chip bonds with the FPC by using a chip on film (COF) technology.

* * * * *